United States Patent [19]
Lazet

[11] 3,967,972
[45] July 6, 1976

[54] SOLUBLE SILICATE DISKS
[75] Inventor: Frank J. Lazet, Media, Pa.
[73] Assignee: Philadelphia Quartz Company, Valley Forge, Pa.
[22] Filed: May 12, 1975
[21] Appl. No.: 576,515

[52] U.S. Cl. ................................. 106/74; 423/332
[51] Int. Cl.² ............................................ C09J 1/02
[58] Field of Search ...................... 106/74; 423/332

[56] References Cited
UNITED STATES PATENTS
3,734,756    5/1973    Pierce ................................. 106/74

Primary Examiner—J. Poer
Attorney, Agent, or Firm—Fred Philpitt; Ernest Posner

[57] ABSTRACT

Fracture and stress free disks of alkali metal silicate are prepared by casting molten silicate glass in cylindrical molds with a very short vertical dimension and cooling. Said disks constitute dust free products or can be further processed into other dust free products.

8 Claims, No Drawings

SOLUBLE SILICATE DISKS

BACKGROUND

This invention relates to the production of a new form of alkali metal silicate glass and in particular is concerned with soluble silicate disks that do not fracture and therefore result in virtually dust free products.

Molten alkali metal silicate glass that is not to be utilized for immediate dissolution is generally cast in iron molds that are approximately 2½ inches (6.35 cm) square by ½ to ¾ inches (1.27 to 1.90 cm) deep. The resulting glass chunks are usually thicker than the depth of the molds unless a leveling roll is used to flatten the glass before it cools and becomes rigid. The glass cooled in such molds is highly stressed; subsequent handling and crushing causes fractures and shattering thereby producing large numbers of very fine particles. Highly stressed glass is also produced when sheets of alkali metal silicate glass are cooled quickly as described in U.S. Pat. No. 3,734,756 issued May 22, 1973, which is hereby incorporated by reference. Handling and crushing of this product also produces many fines and dusty products result.

The fine particles generated when these glass forms are handled or crushed are distinct disadvantages. The ultimate silicate products are dusty and at worst can pose a safety hazard and at best a clean-up problem. Upon dissolving a glass with a large proportion of very fine particles, they agglomerate forming a "sticker". Such a mass of hydrated glass particles does not disperse or dissolve readily and can cause numerous problems in the dissolving equipment.

SUMMARY OF THE INVENTION

I have found that virtually dust free alkali metal silicate products that dissolve without the tendency to form stickers can be prepared by forming silicate glass into thin disks. Molten glass is cast into disk shaped molds of particular dimensions and cooled. The resulting silicate disks are free from the structural stresses associated with glasses cast in different shapes. The stress free glass does not shatter or fracture preventing the generation of very fine particles and dusty products.

THE INVENTION

The molten glass used in producing the disks of this invention is prepared by melting sources of alkali and silica together at a temperature above 1000°C according to well known processes. In general, sand and soda ash are fused to prepare molten sodium silicate glass. After complete melting of the raw materials and formation of a homogeneous glass bed, it is drawn from the furnace for use. Binary glasses consisting of alkali metal and silica are useful in the process of this invention. The process is of particular value in preparing soluble silicate products. The soluble glasses have $SiO_2/M_2O$ mol ratios between 1.5 and 4.5/1.0 wherein M stands for sodium or potassium.

The practice usually followed when the glass is drawn from the bed is that the molten material is cast into square molds or sheets. Even if these materials are allowed to cool slowly, but without annealing, the glass recovered is structurally stressed and fractures or shatters readily. This stressed condition is also found in sheets of glass. It is therefore surprising that I have found that unstressed glass can be produced without annealing by forming it into disks or cylinders with a limited vertical dimension. The molten glass can be formed into disks by any conventional means. The most convenient method involves pouring the molten material into short cylindrical molds. The cooling of the glass and molds to ambient temperature can be accomplished quickly or by allowing the material to cool in response to prevailing thermal conditions. No differences in the stresses are seen in glass disks cooled quickly or slowly. This behavior is in contrast to the glass layers described in U.S. Pat. No. 3,374,756 which shows that relatively thin sheets can be prepared with structural stress. After cooling to ambient temperatures, the glass disks are removed from the molds by known methods.

The shape of the thin disks is critical to forming materials that are free from stress. The shape must be roughly circular to allow cooling to take place in the proper manner to prevent thermal stressing. The dimensions are also of critical importance. The diameter should be ¾ to 2½ inch (1.9 to 6.35 cm) and I prefer 1¼ to 2 inch (3.1 to 5.08 cm). The thickness should not be greater than 7/16 inch (1.12 cm) and I prefer the thickness to be ⅛ to ⅜ inch (0.32 to 0.95 cm).

The resulting silicate disks can be treated as the desired product and shipped as bulk glass. These disks do not shatter and fracture on handling and this product is not dusty. Glass that is cast in large square molds is stressed and fine dusty particles are produced in normal handling. Even bulk shipments of such glass pose dusting problems. The disks can also be crushed to form particles of 20 to 150 mesh. The fraction of material smaller than 150 mesh (~100 microns) is very small and the product is not dusty.

Disks that are prepared with diameters greater than 2½ inch (6.35 cm) show stress lines and therefore fracture or shatter. Disks that are thicker than ⅜ inch also are stressed.

EXAMPLES

The following examples illustrate certain embodiments of the invention, however, they should not be considered restrictive. All mesh sizes are for Tyler series screens.

EXAMPLE 1

A sodium silicate glass with a $SiO_2/Na_2O$ ratio of 2.35/1.0 was prepared by fusion in a glass melting furnace. The glass was drawn from the furnace at a temperature of 1100°C and a portion poured into 2½ inch (6.35 cm) square molds that were ½ inch (1.25 cm) deep. Another portion of the glass was poured into circular molds of 1½ inch (3.8 cm) diameter and ⅜ inch (0.95 cm) deep. Excess glass was eliminated from both sets of molds using a leveling roll. Both sets of samples were allowed to cool and the materials released from the molds. It could easily be seen before the glasses were released from the molds that those cast in the square molds of the prior art had fracture lines and upon release many of these blocks did fracture. None of the disks of the present invention showed any fracture lines and no fractures were observed upon release from the molds. Samples of both glasses were crushed between rollers and the resulting particles screened. Over 5% of powder made from the glass cast in the prior art, square molds was smaller than 400 mesh (37 microns), while only 0.5% of the powder made from the glass handled in accordance with the process of this invention was smaller than 400 mesh.

EXAMPLE 2

Samples of particles prepared as described in Example 1 were dissolved in water. The concentration of silicate solids was 25% and the temperature was 95°C. The silicate particles were added to the water at 95°C under strong agitation. The sample made according to the prior art produced stickers and required filtration to obtain a clear solution. The solids content of this solution was 19%. The sample prepared according to the present invention did not produce stickers. A clear solution did not require filtration and the solids content was 25.07%.

I claim:

1. A fracture and stress free, circular disk of alkali metal silicate which has a diameter of ¾ to 2½ inches (1.9 to 6.35 cm) and a thickness up to 7/16 of an inch (1.12 cm).

2. The alkali metal silicate glass disk of claim 1 wherein the thickness is ⅛ to ⅜ of an inch (0.32 to 0.95 cm).

3. The process for forming a fracture free circular disk of alkali metal silicate comprising the steps of:
   a. forming molten alkali metal silicate glass by fusing a source of alkali and a source of silica;
   b. forming said molten alkali metal silicate glass into a disk with a diameter of ¾ to 2½ inches (1.95 to 6.35 cm) and a thickness up to 7/16 of an inch (1.12 cm); and
   c. cooling said disk so that the alkali metal silicate glass becomes rigid.

4. The process of claim 3 wherein the thickness of the disk is ⅛ to ⅜ of an inch (0.32 to 0.95 cm).

5. The process of claim 3 wherein the molten alkali metal silicate glass is formed into a disk by placing said molten glass into a cylindrical mold, allowing said mold and glass to cool and releasing the rigid disk from the mold.

6. The process for forming substantially dust free alkali metal silicate particles comprising the steps of:
   a. forming a molten alkali metal silicate glass by fusing a source of alkali and a source of silica;
   b. casting said molten alkali metal silicate glass into circular molds of ¾ to 2½ inches (1.9 to 6.35 cm) diameter and up to 7/16 of an inch (1.12 cm) in thickness;
   c. allowing said molds and molten glass to cool and to form thereby forming rigid disks;
   d. releasing the rigid disks from said molds; and
   e. crushing said rigid disks to obtain particles.

7. The process of claim 6 wherein the circular mold is ⅛ to ⅜ of an inch (0.32 to 0.95 cm) deep.

8. A substantially dust free alkali metal silicate particle prepared by crushing a fracture and stress free, circular disk of alkali metal silicate which has a diameter of ¾ to 2½ inches (1.9 to 6.35 cm) and a thickness up to 7/16 of an inch (1.12 cm).

* * * * *